United States Patent
Fujita et al.

[15] 3,639,145
[45] Feb. 1, 1972

[54] ARTIFICIAL LEATHER AND METHOD OF PRODUCING THE SAME

[72] Inventors: Kanji Fujita, Ibaragi-shi; Yoshiaki Sakata, Nishi-Yodogawa-ku, both of Japan

[73] Assignee: The Toyo Rubber Industry Co., Ltd., Nishi-ku, Osaka, Japan

[22] Filed: July 18, 1968

[21] Appl. No.: 745,669

[30] Foreign Application Priority Data

July 18, 1967 Japan..................................42/46482

[52] U.S. Cl..........................117/62, 117/135.5, 117/161 KY, 260/2.5 AY, 260/858, 264/41
[51] Int. Cl.....................B29d 27/00, D29h 7/20, R44d 1/44
[58] Field of Search..................117/63, 135.5, 143, 161 KP, 117/62; 210/506, 507, 508, 510; 260/858, 2.5 AY; 264/41

[56] References Cited

UNITED STATES PATENTS

| | | | |
|---|---|---|---|
| 3,067,482 | 12/1962 | Hollowell | 117/63 X |
| 3,190,766 | 6/1965 | Yuan | 117/135.5 X |
| 3,000,757 | 9/1961 | Johnston | 117/63 |
| 3,100,721 | 8/1963 | Holden | 117/135.5 |
| 3,208,875 | 9/1965 | Holden | 117/63 X |

FOREIGN PATENTS OR APPLICATIONS 690,347  7/1964  Canada..................................117/63

*Primary Examiner*—Murray Katz
*Assistant Examiner*—William R. Trenor
*Attorney*—Sughrue, Rothwell, Mion, Zinn & Macpeak

[57] ABSTRACT

A method of producing artificial leathers which comprises coating a fibrous base material with a polymeric solution containing, as the principal ingredient, a polyurethane-urea elastomer and then treating the coated fibrous base material with a nonsolvent for the polymer to coagulate the polymer. Certain critical methods for producing the polyurethane-urea elastomer, broadly described as either a "prepolymer" process or a "one-shot" process are described in the specification.

8 Claims, No Drawings

ARTIFICIAL LEATHER AND METHOD OF PRODUCING THE SAME

BACKGROUND OF THE INVENTION

1. Field of the Invention

This invention relates to a method of producing artificial leathers by a wet process and permits the obtaining of artificial leathers having excellent moisture permeability by improving the solvent extraction property of a polymer solution after application of it to a base material as to attain smooth and quick washing.

The term "artificial leather," insofar as this specification is concerned means multilayered structures produced by forming a coating layer on a base material in accordance with the present invention.

2. Description of the Prior Art

There have hitherto been known methods of producing microporous sheets which comprise impregnating or coating a fibrous base, or other support, with a polymer solution and then soaking the impregnated or coated base in a liquid which is miscible with the solvent in the polymer solution, but which is a nonsolvent for the polymer, to thereby coagulate the polymer.

This so-called wet coagulation process is a well-known method for producing artificial leathers.

The most suitable polymer for use in the wet coagulation process for the manufacture of artificial leather is flexible polyurethane elastomer, because the polyurethane elastomer resembles collagen in chemical structure and also affords a porous body which resembles natural leathers in touch and other properties. The typical preparation method involves coagulation from a solution with a nonsolvent which is miscible with the solvent in the solution.

However, all flexible polyurethane elastomers are not suitable for use in the manufacture of artificial leathers, even when produced by a wet coagulation process.

The most significant element in the manufacture of artificial leathers is the vital relationship between the chemical structure and physical properties of the flexible polyurethane elastomer involved. For instance, when producing artificial leathers using a flexible polyurethane elastomer which has hitherto been used in the wet coagulation process, it is very difficult to completely extract all solvent from the coated layer and some portion of the solvent will remain in the coated layer. This "remaining" solvent will cause the microporous structure to break up during drying as the temperature of the layer rises during drying. When this occurs, a rough-surfaced artificial leather which has a hard touch to hand and lowered moisture permeability will be formed.

To prevent this phenomenon of "breakup," it is necessary to completely eliminate any solvent from the coated layer of coagulated polymer, and this requires washing for a long period of time followed by frequent squeezings. Consequently, it is necessary to employ very complicated apparatus and working time becomes extremely lengthy.

SUMMARY OF THE INVENTION

The present invention has, as its objects, to enable the production of artificial leathers having good moisture permeability by eliminating "breakup" problems encountered in prior methods, and thus, facilitates the extracting and washing of solvents required in the manufacture of artificial leathers by the wet processes by the use of a polyurethane-urea elastomer having urea linkages in molecules, formed by chain extension with water, in the manufacture of a moisture-permeable coating film on a base or support.

The process generally involves impregnating or coating a fibrous base or support with a polymeric solution based on the polyurethane elastomer described and treating the coated or impregnated base or support with a nonsolvent in order to thereby coagulate the polymer.

The polyurethane-urea elastomer used in the present invention may broadly be produced by either a "prepolymer" process or a "one-shot" process.

In the "prepolymer" process, a high molecular weight glycol (the modulate generally being about 400 to about 5,000) and a molar excess of an organic diisocyanate are reacted. The prepolymer thus formed is dissolved in the solvent and reacted with about 10 to 30 equivalents, per 100 equivalents of isocyanate groups in the prepolymer of water. Since from 90 to 70 equivalents of the isocyanate groups in the prepolymer remain unreacted, the remaining equivalents are reacted with a diamine or a low molecular weight glycol in order to attain chain extension. In total, this process is entitled the "prepolymer" process. The "one-shot" process basically uses a high molecular weight glycol as in the prepolymer process, a low molecular weight glycol and water, the molecular weight glycol and water being used in a molar ratio range of 90:10 to 70:30, respectively. The above are dissolved in a solvent to which is added an equivalent amount (with respect to the active hydrogen-containing compound in the solution) of an organic diisocyanate. The solution is then heated to obtain a polyurethane-urea elastomer.

Generally, the amounts of water, low molecular weight diamine and glycol are determined by reference to the molar excess of diisocyanate present taken with respect to the number of mols of high molecular weight glycol present. Specifically, the molar excess of diisocyanate is determined with respect to the number of mols of high molecular weight glycol. Once this figure is determined, the amount of water necessary may be calculated by determining an amount corresponding to from about 10 to about 30 mol percent "difference" figure. The amount of low molecular weight diamine or glycol required will represent the remaining 90 to 70 percent of this "difference" or balance figure. Thus, it can be seen that the amount of water and the low molecular weight diamine or glycol are closely interrelated.

The use of a polyurethane-urea elastomer produced, as described above, greatly facilitates extraction of the solvent, a problem frequently encountered in the prior art, and thus, makes it possible to obtain a water-vapor-permeable microporous structure very easily, this being a prime object of the present invention.

Various specific materials which may be used in the process of the present invention are set out in detail in the description of the preferred embodiments, and reference should be made hereto.

DESCRIPTION OF THE PREFERRED EMBODIMENTS

The polyurethane-urea elastomer used in the practice of the present invention may be produced as follows:

1. An isocyanate-terminated prepolymer is produced from a high molecular weight glycol, with a molecular weight of 400 to 5,000, and a molar excess of an organic diisocyanate. Specifically, the prepolymer is dissolved in a solvent and reacted with 10 to 30 equivalents, per 100 equivalents of isocyanate groups in the prepolymer, of water, and then with a corresponding 9 to 70 equivalents of a diamine or a glycol in order to attain chain extension. This process is entitled a "prepolymer" process.

2. A high molecular weight glycol, as employed in the prepolymer process, a low molecular glycol and water (the low molecular weight glycol and water being used in a molar ratio range of 90:10 to 70:30) are dissolved in a solvent to give a solution, to which is then added an equivalent amount (with respect to the active hydrogen-containing compound in the solution) of an organic diisocyanate. The solution is then heated to obtain the polyurethane-urea elastomer. This process is called a "one-shot" process.

The present invention uses the polyurethane-urea elastomer produced by using water in an amount corresponding to from about 10 to about 30 mol percent of the balance obtained by subtracting the number of mols of the high molecular weight glycol used from the number of mols of the organic diisocyanate compound. In addition, a low molecular weight diamine or glycol, in an amount corresponding to the remaining 90 to 70 percent of the balance is utilized. The polyurethane-urea elastomer may be produced by either the prepolymer process or the one-shot process. The use of a polyurethane-urea elastomer greatly facilitates extraction of the solvent and makes it possible to obtain a water-vapor-permeable microporous structure without difficulty.

Of course, any water contained in any solvent which is used in the production of the polyurethane-urea elastomer (such as dimethyl-formamide) participates in the reaction. However, it is still necessary to add additional water to adjust the amount of the total water present to 10 to 30 mol percent of the above-mentioned balance.

If water is used in a smaller amount than that described above, the rapidity of the solvent extraction during the coagulation step will be lower, and unextracted solvent will remain in the coagulated layer, which will cause breakup of the microporous structure during the temperature raise accompanying drying.

On the other hand, if water is used in an excessive amount, polymer coagulation will be retarded, and a coagulated layer will be formed which will not withstand the stress imparted thereto during passage over traveler rollers, which will form a shear distortion and/or a flaw in the surface of the coagulated layer.

The term high molecular weight glycol as used in the present invention includes polyalkylene-ether glycols, polyacetal glycols, polyester glycols and mixtures thereof.

As acceptable organic diisocyanate, any of the organic diisocyanates commonly used in the production of polyurethane elastomers may suitably be used. As the low molecular weight diamine used in the practice of the present invention (in the synthesis of the polyurethane-urea elastomer). There may suitably be used, for example, hydrazine, hydrazine hydrate, ethylenediamine, 1,2-propylenediamine, tetramethylenediamine, m-xylylenediamine and similar primary diamines.

As the low molecular weight glycol compound, the following are exemplary: ethylene glycol, propylene glycol, tetramethylene glycol, hexamethylene glycol, neopentyl glycol, diethylene glycol and the like.

As a suitable solvent for the polyurethane-urea elastomer, there may be suitably used acetone, tetrahydrofuran, acetonitrile, N,N-dimethylformamide, N,N-dimethylacetamide, N,N-diethylformamide, tetramethylurea, dimethylsulfoxide and the like.

In the practice of the present invention, the polyurethane-urea elastomer may be used in mixture with a variety of other materials, for example, nylons, polyesters, polyvinyl chlorides, acrylonitrile polymers or similar polymeric material.

In addition, to the polymer solution of the present invention, there may be added definite amounts of a nonsolvent to form a colloidal solution.

The coating composition which forms the microporous layer may be in various forms, and heterogeneous coating compositions containing fine powdered calcium carbonate, milled pulp, or similar finely divided solid materials, or methanolic solutions of copolyamides, which will form nuclei of coagulation, are desirably used.

As the fibrous base, any fibrous sheet material may be used, such as a woven fabric, a knitted fabric, a nonwoven fabric and fibrous fleeces.

The nonsolvent which is used to coagulate the polymer in the microporous state from the polymeric solution may include water, ethylene glycol, glycerol, methanol, ethanol, and the like, and mixtures thereof.

In accordance with the present invention, a moisture-permeable coated film is produced by selecting the desired materials from each class of components as set out above, applying the coating composition to a fibrous base, and then washing and drying the coated or impregnated fibrous base to obtain an artificial leather. According to the present invention, the extraction time for removing or washing solvent is reduced to a period of about 20 minutes, from the 1 to 2 hours time that is required to wash a coated film formed of a polymeric solution obtained by reacting an isocyanate-terminated prepolymer of a polymeric glycol with a diisocyanate and a chain extender containing water in an amount less than 10 mol percent of the balance figure already described.

The present invention will now be illustrated in detail by the following examples which are intended to be illustrative and not limiting.

EXAMPLE 1 a. Preparation of a polyurethane-urea elastomer solution:

One mol of a poly(tetramethylene ether)glycol, with an average molecular weight of 1,400, was reacted with 2 mols of diphenylmethane-4,4'-diisocyanate, with stirring, in the atmosphere of dry gaseous nitrogen at 70° C. for 1½ hours. The reaction mixture was then rapidly cooled at 25° C. in order to obtain a prepolymer with an isocyanate content of 5.89 percent (corresponding to 0.98 times the calculated value of 6.00 percent). The prepolymer was stirred at 20° C. for 30 minutes in dimethylformamide to form a polymer solution with a prepolymer content of 40 percent, and an isocyanate content of 2.30 percent (corresponding to 0.96 times the calculated value of 2.4 percent). To the prepolymer solution, there was then added, with stirring, water in an amount sufficient to form the modified prepolymer solutions listed in Table 1 below.

TABLE 1

1. Unmodified prepolymer, NCO content 2.3 percent (0.96 times the calculated value of 2.40 percent)
2. Modified prepolymer, NCO content 2.13 percent (0.89 times the calculated value)
3. Modified prepolymer, NCO content 1.80 percent (0.75 times the calculated value)
4. Modified prepolymer, NCO content 1.53 percent (0.64 times the calculated value)

To each of the prepolymer solutions listed above there was added, with stirring, a 10 percent solution of 1,2-propylenediamine (in dimethylformamide), which contained di-n-butylamine as a reaction regulator in an amount of 3 percent by weight of the propylenediamine. The reaction system was maintained at a temperature of about 20° to 35° C. After completion of the reaction, the reaction mixtures were adjusted to a polymer concentration of 25 percent.

Each of the four polymer solutions thus formed was compounded in accordance with the following recipe:

| | |
|---|---|
| Polymer solution | 400 parts by weight |
| Fine calcium carbonate powder for use in rubber compounding | 30 parts by weight |
| Pigment (Carbon black) | 3 parts by weight |
| 20% methanolic solution of a copolyamide | 40 parts by weight |
| Total | 473 parts by weight |

Note: The copolyamide was Amilan No. CM4000, manufactured by the Toyo Rayon Company.

The compounding was carried out by first mixing the polymer solution (25 percent concentration) with the fine calcium carbonate powder and pigment at 40° C. for 15 minutes. A propeller-type stirrer at 250 r.p.m. was utilized. The methanolic copolyamide solution (20 percent concentration) was then added, dropwise, with stirring, and the stirring was continued for an additional 30 minutes. From four polymers there were prepared four impregnating compositions, identified as impregnating solutions 1p to 4p.

b. Production of artificial leather:

The four compositions (1p to 4p) prepared as described above, were deaerated under reduced pressure. Each composition was then applied, using a doctor knife, to cotton flannel napped on both sides as base material. Thus, a coating layer of 1.2 mm. thickness was formed, and the coated fabric was exposed to the atmosphere for 5 minutes at 25° C. and a relative humidity of 70 percent. The fabric was then soaked in an aqueous bath containing 3 percent dimethylformamide for 10 minutes and then soaked in a warm water bath at 70° C. for 10 minutes to extract the dimethylformamide. The coated fabric was then passed eight times through squeeze rollers under a pressure of 3 kg./cm., and dried in an air-circulating dryer at 100° to 105° C. to obtain an artificial leather.

The condition of each of the four polymers, before and after chain extension and coating, is summarized in the following table (Table 2).

TABLE 2

| Polymer Number | NCO content[1] | Viscosity of polymer[2] | State of coating film |
|---|---|---|---|
| 1p | 2.30% (0.96) | 18,000 | Uneven surface, microporous structure somewhat broken. |
| 2p | 2.13% (0.89) | 17,500 | Good. |
| 3p | 1.80% (0.75) | 18,000 | Do. |
| 4p | 1.53% (0.64) | 15,800 | Microporous, but deformed on squeezing by rollers. |

[1] Before reaction with 1,2-propylene diamine, ratios to calculated values being indicated in parentheses.
[2] Solution of 25% concentration at 30° C. (centipoises).

Table 2 indicates that polymer compositions No. 2p and 3p, both of which are within the scope of the present invention, were washed effectively in a short period of time, and both gave very good results.

The cotton flannel used as a base material in this example has previously been impregnated with a 10 percent solution of a polymer composition (1p) formed from unmodified prepolymer (1) and subjected to coagulation with water.

EXAMPLE 2 a. Preparation of polyurethane-urea elastomer solutions:

One mol of a poly(ethylene propylene adipate) glycol with an average molecular weight of 2,000, and a molar ratio of ethylene glycol to propylene glycol of 9:1, and 3.5 mols of tetramethylene glycol, were dissolved in dimethylformamide to form a solution with a concentration of 45 percent by weight. The moisture content of this solution was measured, and water was added to the solution in the amount sufficient to make the total water content of the solution equal to the values indicated in the following table (Table 3).

TABLE 3

| Run No. | Total water content (mols) | Mole number of water/3.5 mols +mol number of water) |
|---|---|---|
| 5 | 0.184 | 0.05 |
| 6 | 0.523 | 0.13 |
| 7 | 1.17 | 0.25 |
| 8 | 2.33 | 0.4 |

Each of the solutions thus prepared was added, in the amount of one equivalent, to the active hydrogen containing compounds in the solution of diphenylmethane-4,4'-diisocyanate. The addition was performed with stirring at 40° C. in a stream of dry gaseous nitrogen. The material was then heated at 80° C. to promote reaction. After about 30 minutes dimethylformamide was added to the solution with external cooling to obtain a polymer solution of 25 percent concentration. The dimethylformamide which was added to the reaction mixture had had methanol added thereto in an amount corresponding to 5 mol percent of the active hydrogen-containing compounds in the reaction system. This served the purpose of stopping the reaction and stabilizing the viscosity of the resulting polymer solution.

The polymer solution obtained was compounded in accordance with the following recipe:

| Polymer solution | 400 parts by weight |
| Fine calcium carbonate powder for rubber compounding use | 30 parts by weight |
| Pigment (Carbon black) | 3 parts by weight |
| 20% methanolic solution of a copolyamide (Amilan No. 4000, Toyo Rayon Company) | 40 parts by weight |
| Total | 473 parts by weight |

The compounding of the polymer solutions was carried out in the same manner as in Example 1. Thus, coating or impregnating compositions 5p to 8p were prepared from these four polymers.

b. Production of artificial leather:

The four compositions prepared as described above were deaerated under reduced pressure and individually applied to separate webs of a cotton flannel, which was fluffed on both sides and which had previously been impregnated with a 10 percent solution of polymer composition 5p (formed from polymer No. 5) and treated with water to effect coagulation, at a thickness of 1.2 mm. A doctor knife was utilized. The thus coated fabric was exposed to the atmosphere at 25° C. and a relative humidity of 70 percent for 5 minutes, then soaked in an aqueous bath containing 5 percent dimethylformamide at 30° C. for 10 minutes and then soaked in a warm aqueous bath at 70° C. for 10 minutes to attain extraction of dimethylformamide. The coated fabric was then passed 8 times through squeeze rollers under a pressure of 3 kg./cm. and dried in an air-circulating dryer at a temperature of 100° to 105° C. to obtain an artificial leather. The condition of the four polymers and the condition of the coating films made therefrom are summarized in the following table (Table 4).

TABLE 4

| Run Number | Molar ratio[1] | Viscosity[2] | Condition of the coating film |
|---|---|---|---|
| 5p | 0.95/0.05 | 17,000 | Uneven surface, partially broken microporous structure. |
| 6p | 0.87/0.13 | 19,000 | Good. |
| 7p | 0.75/0.25 | 18,500 | Good. |
| 8p | 0.6/0.4 | 19,000 | Microporous, but deformed on squeezing. |

[1] Tetramethylene glycol/water.
[2] 25% polymer solution (cps. at 30° C.)

Table 4 indicates that polymer compositions 6p and 7p, within the scope of the present invention, could be effectively washed in short periods of time to give very good results.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of producing artificial leathers which comprises:
   a. Coating a fibrous base material with a polymeric solution which consists essentially of as the principal ingredient, a polyurethane-urea elastomer which has been synthesized from a high molecular weight glycol, a molar excess of an organic diisocyanate, said excess being with respect to the high molecular weight glycol, water, and a member selected from the group consisting of a low molecular weight glycol an a diamine, the water being present in an amount equal to from about 10 to about 30 molar percent of the excess number of moles of the organic diisocyanate over the high molecular weight glycol, and the member selected from the group consisting of a low molecular weight glycol and a diamine being present in an amount equal to from about 70 to about 90 molar percent of the excess number of moles of the organic diisocyanate over the high molecular weight glycol, the total number of moles of the water and the member selected from the group consisting of a low molecular weight glycol and a diamine being equal to the excess number of moles of organic diisocyanate over the high molecular weight glycol, b. Treating the coated fibrous base material with a nonsolvent for the polymer in order to thereby coagulate the polymer, c. Extracting the solvent in the polymer from said treated material, and d. Drying said material.

2. The method as defined in claim 1 in which there is used a polyurethane-urea elastomer obtained by forming an isocyanate-terminated prepolymer from a high molecular glycol, with an average molecular weight of from about 400 to about 5,000, selected from the group consisting of poly(alkylene ether) glycols, polyacetal glycols and polyester glycols and a molar excess of an organic diisocyanate, dissolving the prepolymer in a solvent selected from the group consisting of acetone, tetrahydrofuran, acetonitrile, N,N-dimethylformamide, tetramethyl-urea and dimethylsulfoxide and then reacting the prepolymer in solution with water, the water being present in an amount corresponding to from about 10 percent to about 30 percent of the number of equivalents of the isocyanate groups in the prepolymer, and subsequently reacting the prepolymer with a diamine selected from the group consisting of hydrazine, hydrazine hydrate, ethylenediamine, 1,2-propylenediamine, tetramethylenediamine and m-xylylenediamine in order to thereby attain chain extension.

3. The method as defined in claim 1 in which there is used a polyurethane-urea elastomer obtained by adding to a solution of a high molecular glycol, with an average molecular weight of from about 400 to about 5,000, selected from the group consisting of poly(alkylene ether) glycols, polyacetal glycols and polyester glycols, water and a low molecular glycol, the molar ratio of low molecular glycol to water being adjusted to from about 90/10 to about 70/30, in a solvent selected from the group consisting of acetone, tetrahydrofuran, acetonitrile, N,N-dimethylformamide, tetramethylurea and dimethylsulfoxide, a molar equivalent amount, said equivalent taken with reference to the total active hydrogen-containing compounds in the solution, of an organic diisocyanate, and effecting the reaction between the organic diisocyanate, and the active hydrogen containing compounds.

4. The method as defined in claim 3 in which the low molecular glycol is one selected from the group consisting of ethylene glycol, propylene glycol, tetramethylene glycol, hexamethylene glycol, neopentyl glycol and diethylene glycol.

5. The method as defined in claim 1 in which the nonsolvent is selected from the group consisting of water, ethylene glycol, glycerol, methanol and ethanol.

6. The method as defined in claim 1 in which the fibrous base material is selected from the group consisting of woven fabrics, knitted fabrics, nonwoven fabrics and fibrous fleece.

7. The method as defined in claim 1 in which there is used a polymeric solution having incorporated therein at least one polymer selected from the group consisting of nylons, polyesters, polyvinyl chlorides, acrylonitrile polymers and copolymers thereof.

8. The method as defined in claim 1 in which a finely divided solid material selected from the group consisting of precipitated calcium carbonate and milled cellulose pulp is added to the polymeric solution.

* * * * *